(12) United States Patent
Aarntzen (10) Patent No.: US 6,216,741 B1
(45) Date of Patent: Apr. 17, 2001

(54) FLOW LIMITER

(75) Inventor: Richardus Hendrikus Arnoldus Aarntzen, Gendt (NL)

(73) Assignee: Watts Ocean B.V., Eerbeek (NL)

( * ) Notice: Subject to any disclaimer, the term of this patent is extended or adjusted under 35 U.S.C. 154(b) by 0 days.

(21) Appl. No.: 09/345,272

(22) Filed: Jun. 30, 1999

(51) Int. Cl.[7] .................................................. F15D 1/02
(52) U.S. Cl. ................................................. 138/43; 138/46
(58) Field of Search .......................... 138/43, 45, 46, 138/31

(56) References Cited

U.S. PATENT DOCUMENTS

| | | | |
|---|---|---|---|
| 1,427,485 | * | 8/1922 | Lindberg ................................ 138/46 |
| 3,340,899 | * | 9/1967 | Welty et al. ............................ 138/43 |
| 3,431,944 | * | 3/1969 | Sakuma .................................. 138/43 |
| 3,749,122 | * | 7/1973 | Gold ....................................... 138/44 |
| 3,817,151 | * | 6/1974 | Kawabata et al. ..................... 138/46 |
| 4,044,991 | * | 8/1977 | Waller .................................... 138/46 |
| 4,388,052 | * | 6/1983 | Falendysz, Sr. et al. .............. 138/31 |
| 4,650,094 | * | 3/1987 | Werding ................................. 138/45 |
| 4,700,750 | * | 10/1987 | Cook ...................................... 138/46 |
| 4,796,660 | * | 1/1989 | Bron ....................................... 138/46 |
| 4,883,093 | * | 11/1989 | Miles et al. ............................. 138/45 |
| 4,887,637 | * | 12/1989 | Ketner .................................... 138/46 |
| 5,081,847 | * | 1/1992 | Anderson, Jr. ......................... 138/43 |
| 5,565,063 | * | 10/1996 | Begemann et al. .................... 138/45 |
| 5,582,210 | * | 12/1996 | Bartholomew ........................ 138/45 |
| 5,638,868 | * | 6/1997 | Loran ..................................... 138/30 |
| 5,971,027 | * | 10/1999 | Beachley et al. ...................... 138/31 |

* cited by examiner

Primary Examiner—James Hook
(74) Attorney, Agent, or Firm—Webb Ziesenheim Logsdon Orkin & Hanson, P.C.

(57) ABSTRACT

A device for limiting the flow rate of a liquid generally includes a tubular and rotation-symmetrical housing with an inlet opening and an outlet opening for the liquid. A substantially rotation-symmetrical first body is guided for axial displacement and urged toward the inlet opening by a spring. The first body includes a widest peripheral part located at a distance from an inner wall of the housing. An annular second body is disposed in a stationary position on the inner wall of the housing. As liquid flow increases through the device, the first body moves toward the second body while reducing a passage size of a gap defined between the first body and the second body.

33 Claims, 7 Drawing Sheets

FLOW LIMITER

BACKGROUND OF THE INVENTION

1. Field of the Invention

The invention relates to a device for limiting the flow rate of a liquid.

2. Description of the Prior Art

Flow limiters are known wherein the control elements consist at least partially of elastomer material. Such known structures have the drawback that their control characteristics are not manageable and, even in the case of careful and accurate production, different flow limiters can possess highly diverse characteristics.

SUMMARY OF THE INVENTION

It is a first object of the invention to provide a flow limiter which combines a simple structure with characteristics which are predictable and manageable within narrow limits.

In respect of the above objective the invention provides a device for limiting the flow rate of a liquid, which device comprises:
- a generally tubular, rotation-symmetrical housing with an inlet opening and an outlet opening for the liquid;
- a first substantially rotation-symmetrical body which is guided for axial displacement and urged toward the inlet opening by spring means and which is located with the periphery of its widest part at a distance from the inner wall of the housing;
- a generally annular second body disposed in stationary position on the inner wall of the housing;
- wherein as the liquid flow increases the first body moves toward the second body while reducing the size of the passage in the gap defined by the first body and the second body;
- which housing, which first body and which second body are form-retaining.

A specific embodiment has the special feature that the housing, the first body and the second body each consist of a form-retaining material, for instance metal such as aluminium, steel, stainless steel, or a hard plastic such as ABS, PPA, PA, POM, PP or the like. Combinations can also be applied.

The specific embodiment has the special feature that the first body has a shape narrowing toward the inlet opening, for instance a generally conical, spherical, parabolic or hyperbolic shape. The upstream surface or front surface of the first body can optionally also have a flat shape. A rotation-symmetrical, narrowing form can have the advantage of a more regular and better manageable symmetrical loading of the first body by the liquid flow, which can enhance management of the control characteristic.

Another embodiment has the special feature that the second body is interchangeable with a second body with dimensioning adapted to different technical requirements, The second bodies can together form a set, the different members of which carry specific information, for instance in the form of colour codes, corresponding to a specific control characteristic or a specific flow limiting value which can be realized with such a second body.

A particular embodiment of the device according to the invention has the feature that the second body has a number of passage openings ordered in a circle.

In accordance with another aspect of the invention, the device has the special feature that the gap is defined by respective co-acting surfaces with a form narrowing toward the outlet opening.

This latter embodiment can have the special feature that cylindrical steps are superimposed on the co-acting surfaces. A combination of the embodiment in which the second body has a circle of passage openings and the embodiment with the superimposed cylindrical steps can have the feature that the passage openings are situated in the zones between the cylindrical steps.

Very simple in terms of production technique is an embodiment wherein the second body is connected to the housing by a snap connection.

As an alternative to said passage openings, a variant of a device according to the invention can have the special feature that the second body has a number of recesses debauching on its inner surface and serving as flow channels.

The invention with the co-acting surfaces having shapes narrowing downstream can have the feature that the co-acting surfaces have shapes which are chosen so as to obtain a desired control characteristic, for instance substantially parabolic, substantially hyperbolic or other shapes causing progression or degression.

The spring means can be manufactured from any suitable material, for instance spring steel Or an appropriate plastic. According to a specific aspect of the invention the device has the feature that the spring means contain memory metal. Such an embodiment is particularly suitable for heat-exchanging installations. A multi-stage control path can be realized with such an embodiment. Energy losses can be limited herewith in heating systems. Such energy losses are often designated initial losses, starting and stopping losses.

According to a very advantageous aspect of the invention the device has the feature that in its rest position the first body presses sealingly against an elastic sealing ring which is connected fixedly to the inner surface of the housing and engages on the first body in the zone situated upstream of the widest part of the first body such that the device can also act as a non-return valve.

In a practical embodiment the device has the feature that the first body is supported by a stem which is slidable in a bush connected by one or more spokes to the second body or to the housing.

In a variant the device has the characterizing feature that the gap is defined by a surface of the first body narrowing in flow direction and the free end edges of a circle of lips formed curving toward this surface and having a common form narrowing in upstream direction such that as the flow rate increases the first body is displaced downstream and the lips bend elastically inward.

A specific embodiment has the special feature that the first body defines together with a foremost peripheral edge of the housing an at least more or less flat, annular inlet opening. A great effectiveness of the device can hereby be combined with a relatively small overall depth.

According to another aspect of the invention the device has the special feature that a plate disposed fixedly relative to the housing is situated upstream of the first body. This plate acts in a certain sense to screen the first body against abrupt pressure variations, thus ensuring a more even closing behaviour of the device.

This latter embodiment can have the special feature that the plate defines together with a foremost peripheral edge of the housing an at least more or less flat, annular inlet opening. In this case also a device is realized combining a high degree of effectiveness with a small overall depth.

The spring means can for instance be embodied as at least one usual helical spring. However, a better management and reproducibility is realized with an embodiment wherein the spring means comprise leaf spring means. In a practical embodiment this latter variant has the feature that the leaf spring means are monolithic and comprise a ring connected to the housing and comprising a number of lips supporting the first body. The lips in question can for instance extend substantially radially. In order to realize other spring characteristics the lips can also take other forms, for instance generally spiral shapes and can further have a width varying along their length.

In respect of a good management of the spring characteristic, an embodiment is recommended wherein the leaf spring means consist substantially of stainless steel or spring steel.

The leaf spring means can for instance be manufactured by punching the spring means from sheet material. Punching has the drawback however that the dimensional accuracy can leave something to be desired and that sharp edges can result which may affect the characteristics of the device. In this respect an embodiment is recommended wherein the leaf spring means are manufactured by etching or laser-cutting.

In order to obtain a more readily manageable characteristic and to influence the characteristic such that at low pressure the devices allow a greater flow, a preferred embodiment has the special feature that the first body has at least one continuous hole. Due to the presence of the continuous hole some of the effective force is removed from the first body.

In the case where use is made of one continuous hole, this is preferably arranged centrally. In the case where a plurality of continuous holes is applied, these holes are mutually ordered such that the first body is substantially loaded only by a force acting in an axial direction without there being any danger of tilting. A number of holes disposed in the shape of a ring can for instance be placed in an angularly equidistant manner.

In order to achieve that even under extreme conditions there is no danger of the first body completely closing the device, in a specific embodiment the device can have the special feature that the first body has on its downstream end edge a number of protrusions between which liquid can flow, also in the relevant extreme end position.

A specific embodiment of the device according to the invention has the feature that the first body comprises a part with a general beaker shape with a mouth rim directed toward the downstream side of the device, which mouth rim is situated in an annular space defined by the second body and comprises an annular edge directed in the upstream direction of the device such that the flow in the zone of the mouth rim and the annular edge displays the general form of a meander. This embodiment combines a simple structure with a very effective operation, with the option of realizing the device with a very small length. The described meander form means that the direction of the flow undergoes a substantial change in direction as it passes, respectively, the mouth rim and the annular edge. A very effective destruction of energy can hereby be achieved.

It should also be appreciated that the meander form can take a multiple form. This can be realized by providing the first body with two or more parts with a general beaker shape, which parts are positioned mutually coaxially. The number of annular edges must correspond with the number of beakers.

BRIEF DESCRIPTION OF THE DRAWINGS

The invention will now be elucidated with reference to the annexed drawings. Herein:

FIG. 3a shows a partly broken-away perspective view of a third embodiment;

FIG. 3b shows a cross-section through a detail of the embodiment of FIG. 3a;

FIG. 4a is a partly broken-away perspective view of a fourth embodiment;

FIG. 4b shows an end view of the device of FIG. 4a;

DETAILED DESCRIPTION OF THE PREFERRED EMBODIMENTS

It is noted that all embodiments of the flow limiter according to the invention to be described hereinafter have one important aspect in common, i.e. that in contrast to the prior art use is made of a control element which is not based on the use of elastomers but on form-stiff elements and spring means of manageable type.

Figure 1:
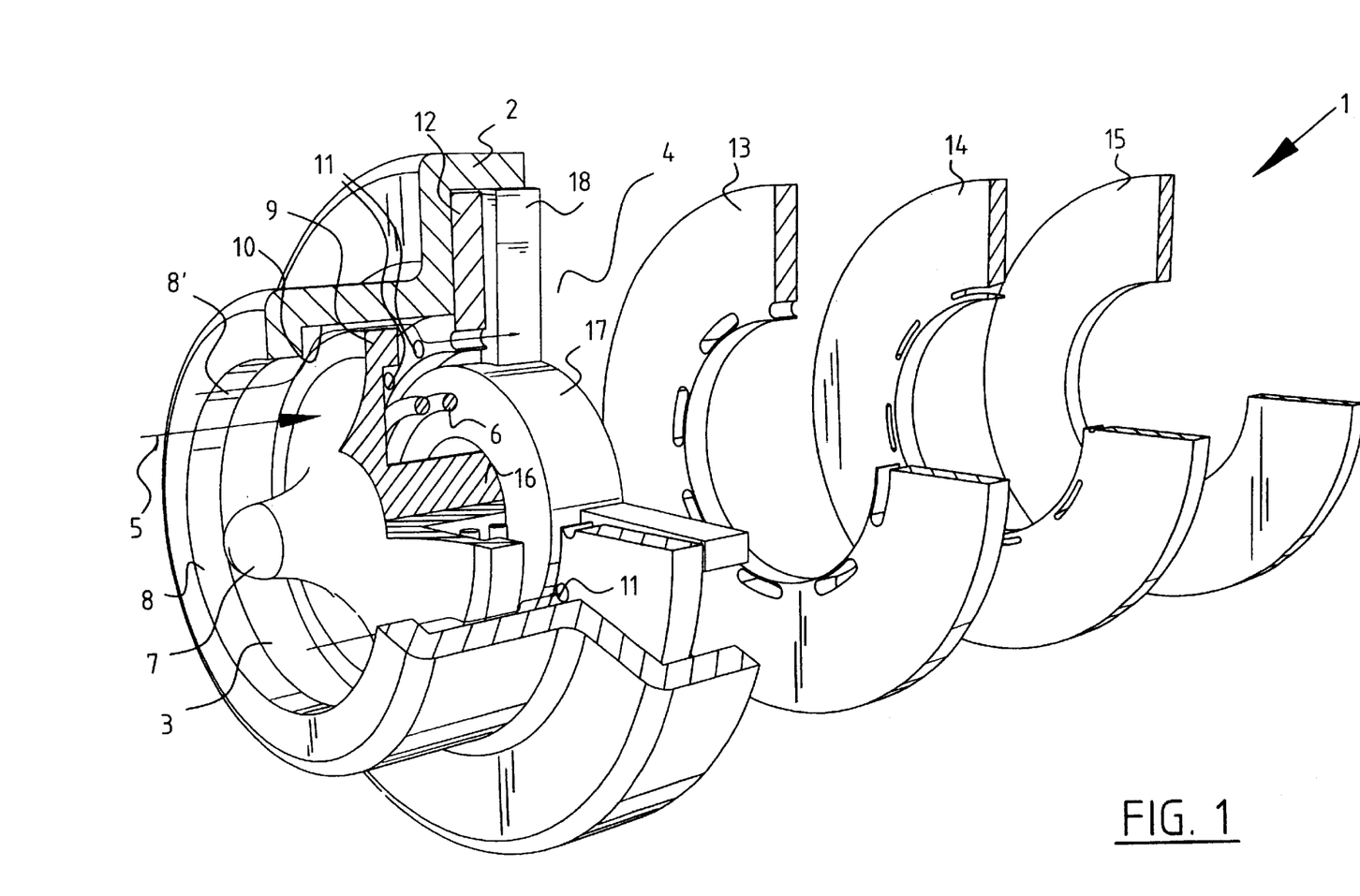
FIG. 1 shows a partly broken-away perspective view of a first embodiment having therein a set of alternative rings.

FIG. 1 shows a flow limiter 1 comprising a generally tubular, rotation-symmetrical housing 2 with an inlet opening 3 and an outlet opening 4 for the liquid, the inflow direction of which is indicated very generally and roughly with an arrow 5. A helical pressure spring 6 urges a first substantially rotation-symmetrical body 7 guided for axial displacement in the direction of inlet opening 3. A stable rest position is defined by the released position of the spring 6. A stop edge 8 is situated around the mouth of inlet opening 3 to prevent first body 7 from being lost. As indicated by an arrow 8', the liquid flow is guided through a number of limited passages and along obstacles for the greatest possible destruction of energy. First body 7 has a widest part 9 which connects onto the generally hyperbolic, rotation-symmetrical front surface and which is located a certain distance from a cylindrical inner surface 10 of housing 2. Downstream is situated a ring 12 which is provided with a circle of perforations 11 and which is interchangeable with alternative rings 13,14,15. With their specific dimensioning and/or pattern of continuous holes or perforations, the rings each define the resistance a flow encounters. The line of flow 8' indicates clearly that the flow must overcome a substantial number of obstacles to flow from inlet opening 3 to outlet opening 4. As the infeed pressure of the flow increases, the first body 7 is pressed to the right while compressing spring 6, where it tends to form an increasing obstacle and resistance to the flow in co-action with the applied ring 12 (or 13,14 or 15).

Stem 16 of the first body 7 is guided slidably in a bush 17 supported by housing 2 via spokes 19.

During operation of flow limiter 1 not only is the clear passage space changed, but a strong, multiple and repeated deflection of the flow also takes place in the described manner, which results in an effective and uniform pressure destruction. This structure comprising multiple disruptions of the flow in combination with the reduction in size of the effective passage results in substantially less cavitation than in the known art and thereby also in less noise production and mechanical vibrations, wherein it is noted that in the known products the whole pressure drop normally takes place in a very short and single-stage path.

Discs or rings 12, 13, 14, 15 can each be specific to a flow limiting value. Structures other than those shown can also be applied, for instance the use of ribs, other thicknesses, different surface structures of the surfaces over which flow takes place, etc. The rings can be mutually distinguished by for instance a colour code.

A number of fields of application of this embodiment and the embodiments to be discussed below are drinking water, sanitary fittings, heating, solar energy systems and so on.

The embodiments of FIGS. 2–6 combine a flow limiting function with the function of a non-return valve.

Figure 2:
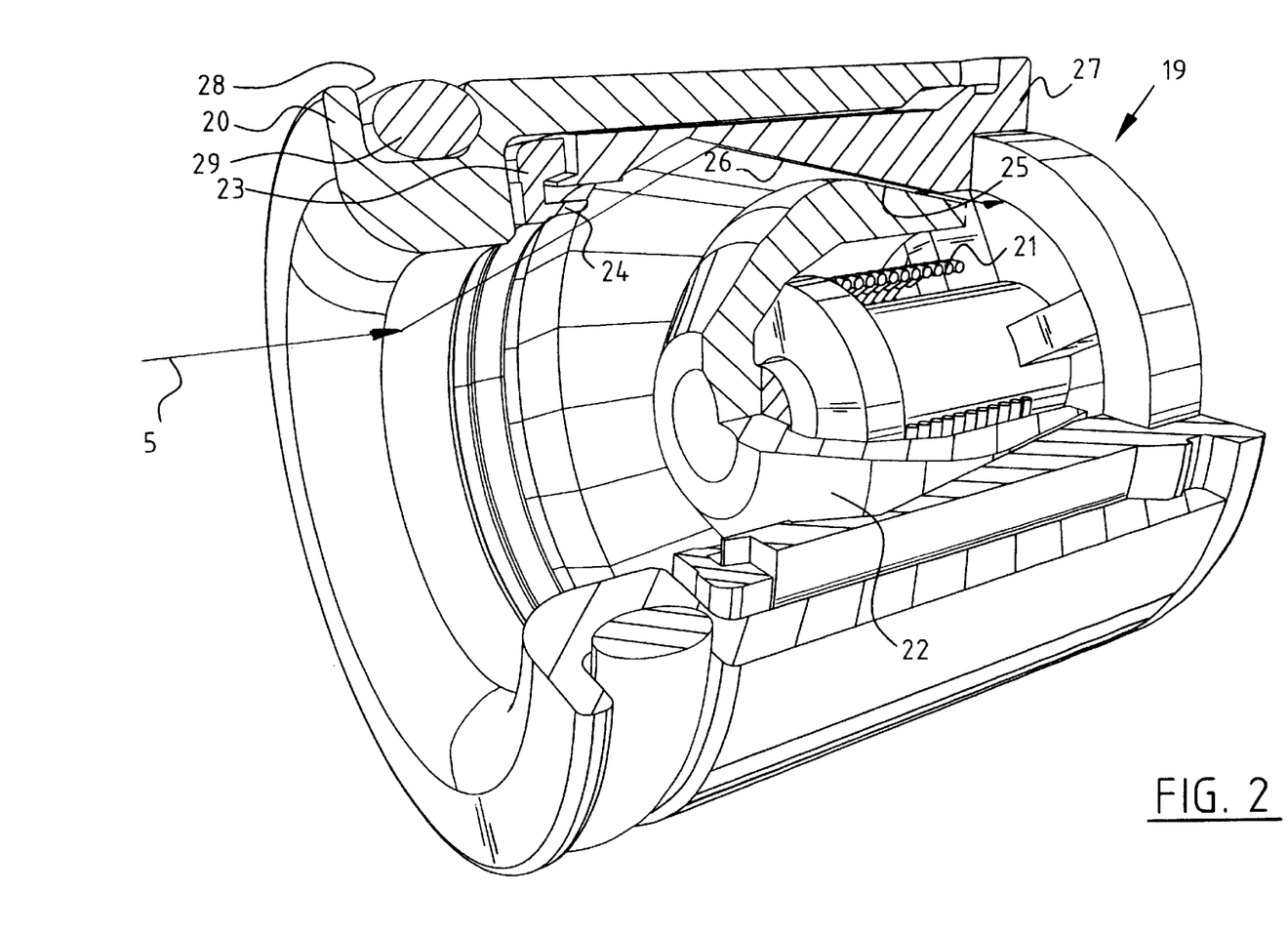
FIG. 2 shows a partly broken-away perspective view of a second embodiment.

Flow limiter 19 likewise comprises a generally tubular housing 20 in which is accommodated a first body or valve body 22 loaded by a spring 21. The first body 22 fulfills two functions, i.e. the function of variable control element for the flow limiting function and that of valve body for the function of non-return valve.

In respect of the non-return valve function the flow limiter 19 includes an annular flexible sealing ring 23 of rubber elastic material. Ring 23 includes an annular lip 24 which co-acts sealingly with the valve body 22 in the closed situation of the non-return valve.

The valve body 22 has a generally conical downstream surface 25 which co-acts with a correspondingly shaped surface 26 on the inner side of housing 20 and is formed on an insert 27 in a snap-fit connection therewith. As arrow 5 shows, in the active situation shown in FIG. 2 the effective passage between surfaces 25 and 26 is considerably narrowed due to the liquid pressure, thus providing the flow limiting function.

On its outer side housing 20 has an annular groove 28 in which is accommodated a rubber elastic O-ring 29. The flow limiter 19 can be pushed sealingly into an annular passage by means of this structure.

Figures 3A, 3B:
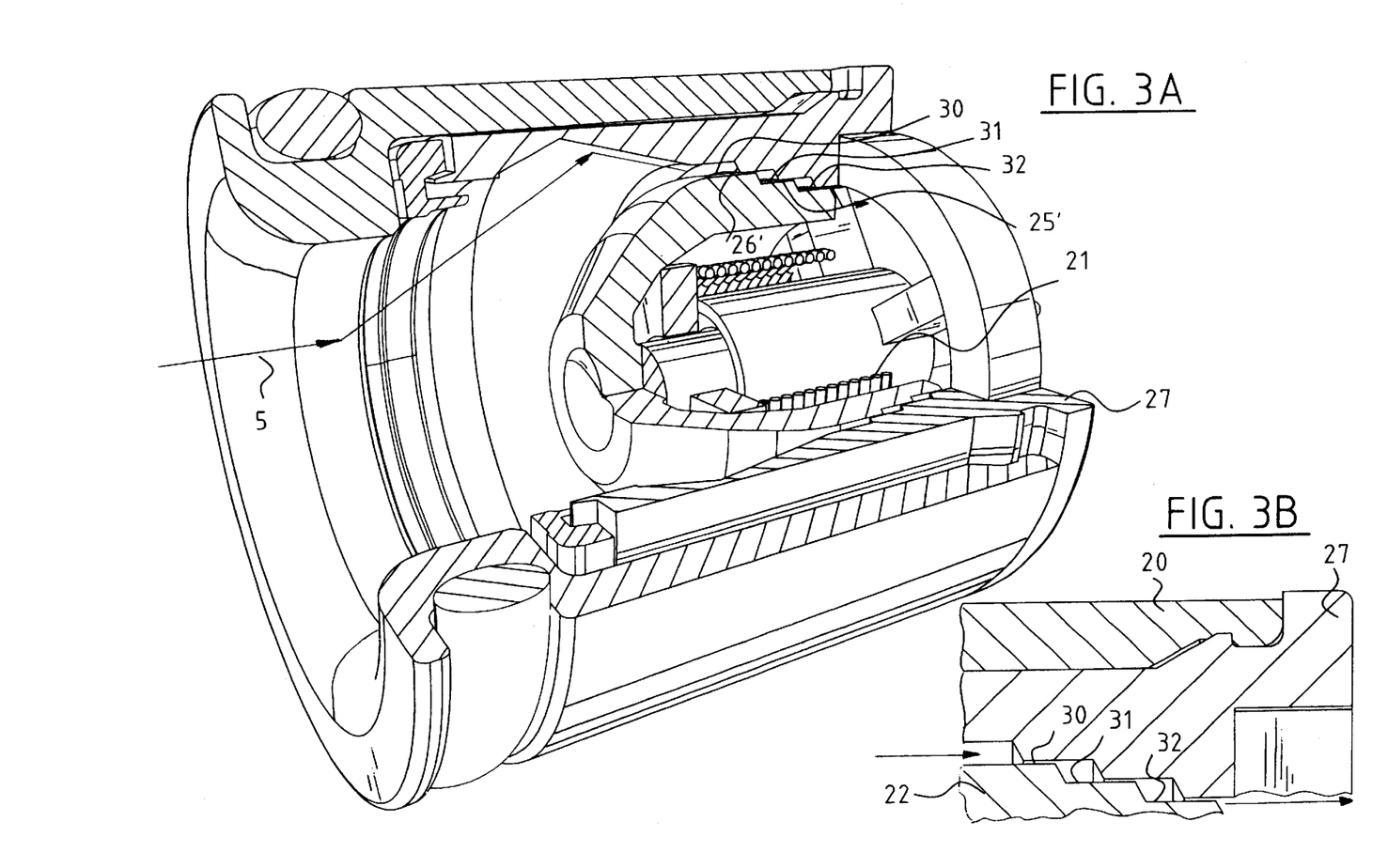

FIG. 3a shows a variant of the embodiment according to FIG. 2. In this third embodiment the active surface 25' co-acting with active surface 26' is, in contrast to FIG. 2, not substantially conical in form but provided with substantially cylindrical steps 30, 31, 32 which can be deemed as superimposed on the conical surfaces 25, 26 of FIG. 2. The pressure destruction is effectively further increased hereby. There is certainly in this latter embodiment an effective pressure destruction in a larger number of steps which in this "cascade" configuration, ensures a very manageable and effective flow limitation with negligible noise production. The control range and the control characteristic can be influenced and reproduced very well in the embodiments of FIGS. 2 and 3. The characteristics can be predicted very well, which results in a design with little wastage during production and properties which can be readily managed.

In this and the other embodiments the spring 21 can, in determined conditions advantageously, be manufactured from memory metal. In this case a two-step control for heat-exchanging installations, for instance heating devices, solar energy systems and the like, can be avoided. The invention can hereby make an additional contribution towards realization of the intention to manufacture an increasing number of energy-saving products. Attention is drawn to the fact that the generally conical forms of surfaces 25 and 26 shown in FIG. 2 can also be other, for instance, parabolic or hyperbolic control forms or other forms causing progression or degression. A control characteristic can hereby be varied within wide limits in a readily manageable manner. This characteristic can be finely adjusted by for instance making the spring adjustable or by making the relative position of first body 22 and second body 27 adjustable. Use can also be made of other springs or the spring characteristic can be altered.

It is noted that all the drawn embodiments have in common that the stem of the first body is supported slidably by a bush which is connected to the housing by spokes.

FIG. 3B shows a large cross-sectional view of an essential component of FIG. 3a.

Figures 4A, 4B:
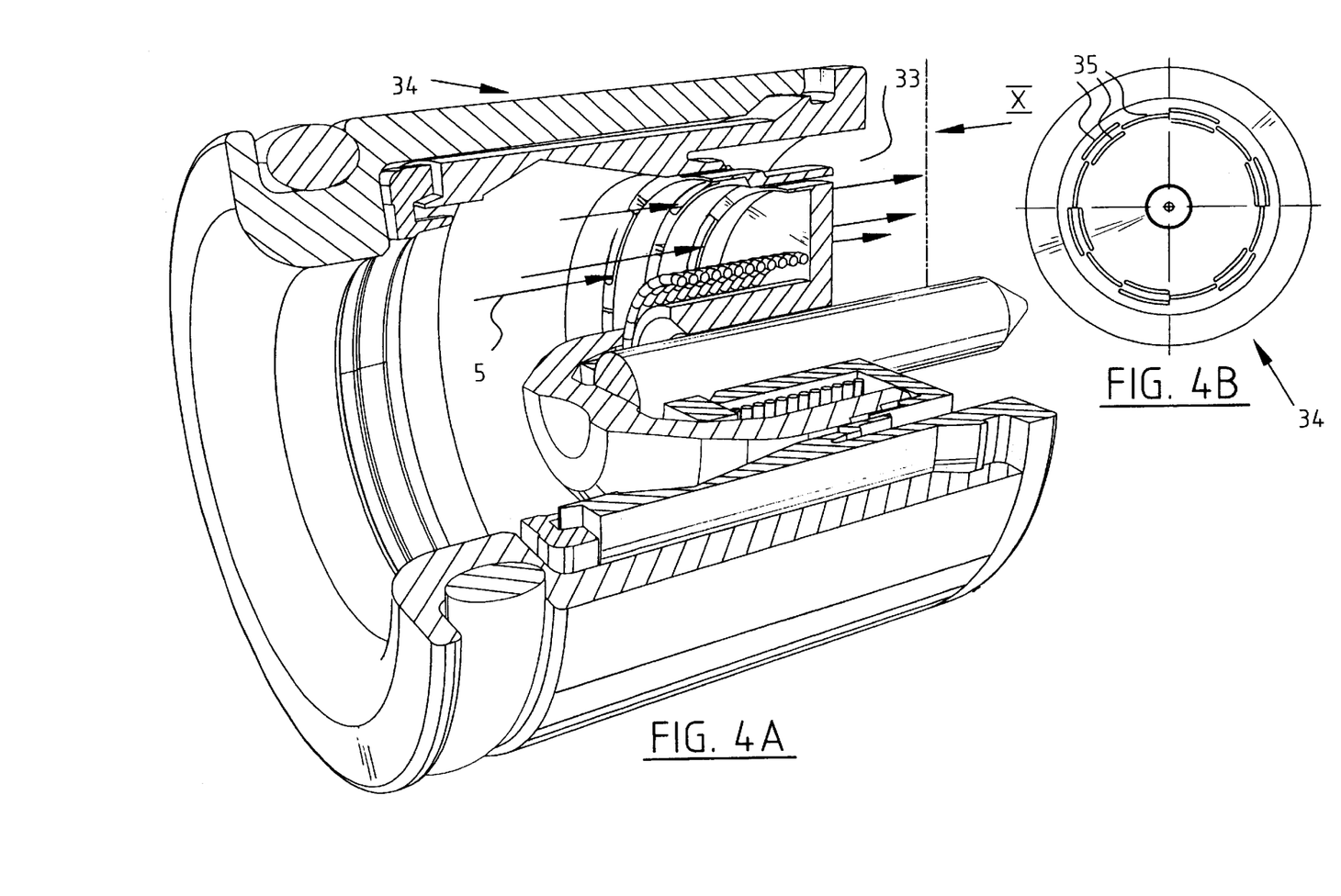

FIG. 4A shows a fourth embodiment. In this embodiment, which can be viewed as a further development of the embodiment of FIG. 3, the conically tapering transition rings between the steps are perforated and connect onto outlet opening 33.

The perforations are shown particularly clearly in the rear view of FIG. 4b. This figure shows flow limiter 34 from the rear. For the sake of convenience the perforations are all designated with reference numeral 35.

Figures 5A, 5B:
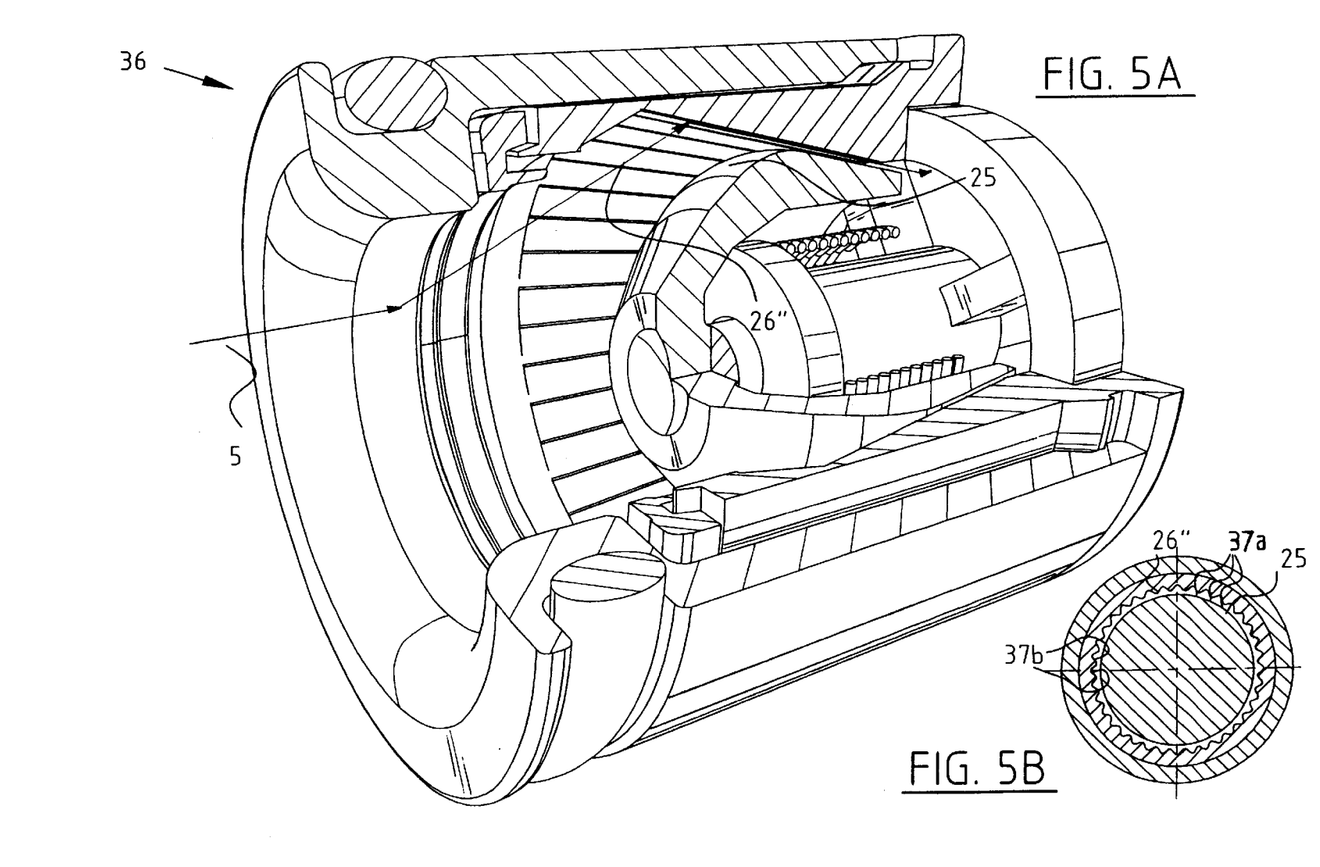
FIG. 5a is a partly broken-away perspective view of a fifth embodiment.
FIG. 5b shows a cross-section through the coacting part of the first and the second body.

FIGS. 5A and 5B show a flow limiter 36 which is another variant of the embodiment of FIG. 2. In this embodiment the surface 26" is not flat as the surface 26 of FIG. 2 but has longitudinal ribs 37a defining through-flow channels 37b. This embodiment also has the advantage of an effective pressure destruction over a relatively long path and a high degree of adjustability and reliability of the design, without this entailing substantial cost increases.

Figure 6A:
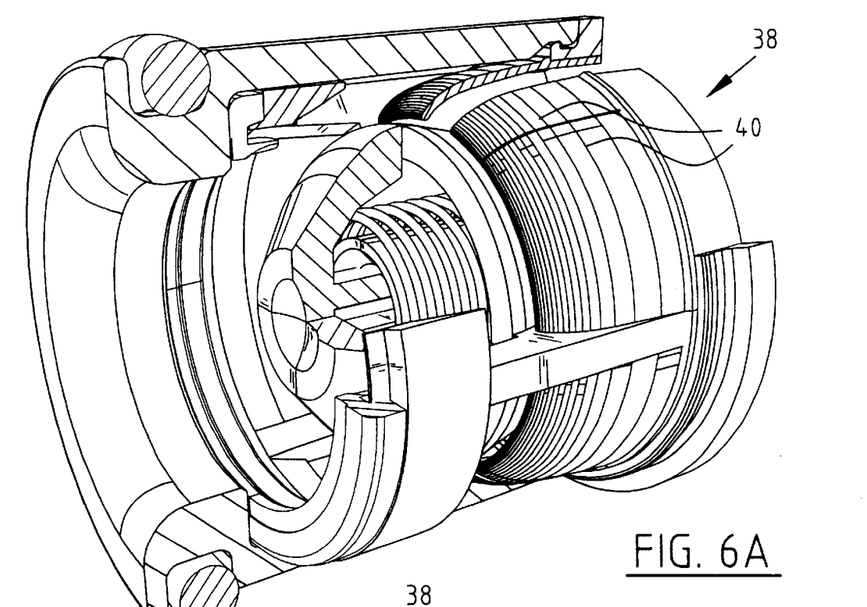
FIG. 6a is a partly broken-away perspective view of a sixth embodiment in operational position.
Figure 6B:
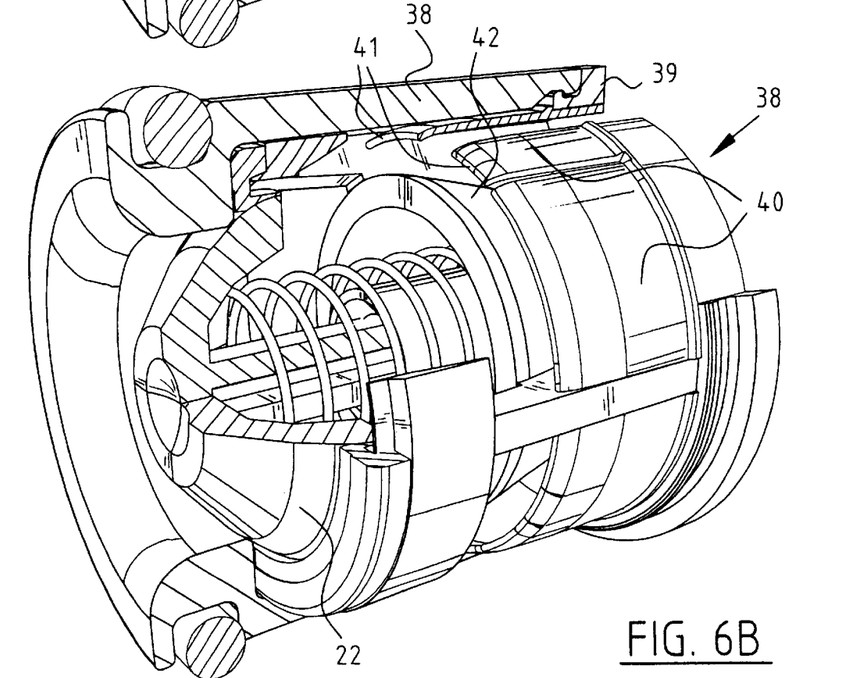
FIG. 6b shows a view corresponding with FIG. 6a in the rest position.

FIG. 6A shows a sixth embodiment in an operative situation, while FIG. 6b shows this device in the situation where the non-return valve is closed.

In this embodiment housing 38 bears a ring 39 which is connected thereto by a snap-fit connection and which in the manner of an insert carries a number of segment-shaped, relatively thin and thereby elastic lips 40. These lips 40 curve inward with their ends 41 in the manner shown and in the rest position shown in FIG. 6b have a substantially cylindrical common form. At a relatively great infeed pressure of the liquid and therewith an increased flow, the curved ends 41 will be placed under a pressure such that the lips 40 curve inward in the manner shown in FIG. 6a and, together with the generally conical surface 42 of body 22 narrowing in downstream direction, thereby cause a substantial restriction of the passage of the flow and thereby bring about an effective limitation of flow rate.

Figures 7, 8:
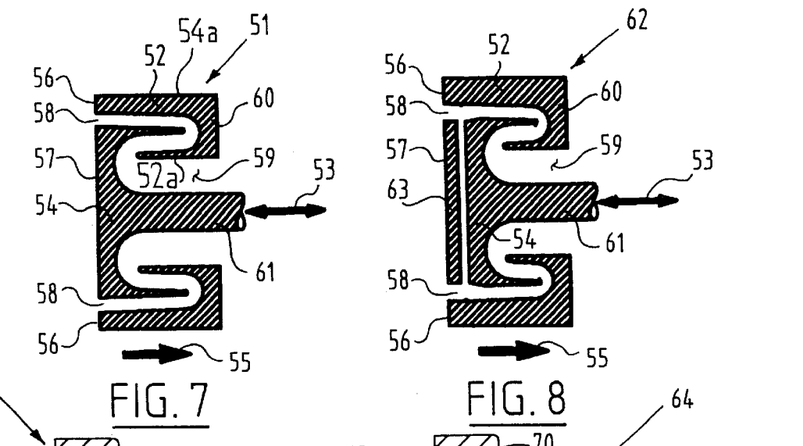
FIG. 7 is a schematic longitudinal section through another embodiment.
FIG. 8 shows a longitudinal section corresponding with FIG. 7 through a variant.

FIG. 7 shows schematically in longitudinal section a flow limiter 51 with a housing 52 and a first body 54 movable axially as according to arrow 53. The flow direction is indicated with an arrow 55. The first body 54 includes a portion 54a extending in a downstream axial direction of the flow limiter 51 and positioned in an annular space 80 defined by the housing 52. The housing 52 includes an annular edge 52a extending in an upstream axial direction of the flow limiter 51 such that the liquid flow in the device reverses directions at least once along an axial direction through the flow limiter 51. The reversal of direction of the liquid flow is illustrated in the flow limiter 64 of FIG. 10, which is discussed hereinafter.

A forward edge 56 of the housing 52 defines with front surface 57 of the first body 54 a substantially flat annular inlet opening 58. Outlet opening 59 is defined by rear surface 60 of the housing 52 and stem 61 of first body 54. In this embodiment the ratio of the surface areas of outlet opening 59 and inlet opening 58 is 100%.

FIG. 8 shows a flow limiter 62 wherein a plate 63 placed fixedly relative to housing 52 is situated upstream of the front surface 57 of the first body 54. The plate 63 serves as effective screening of the first body 54 against abrupt pressure variations. This reduces the danger of sudden abrupt closure of the device in the case of pressure pulse.

In FIG. 7 and FIG. 8 the reset spring means are not drawn for the sake of clarity.

Figures 9, 10, 11:
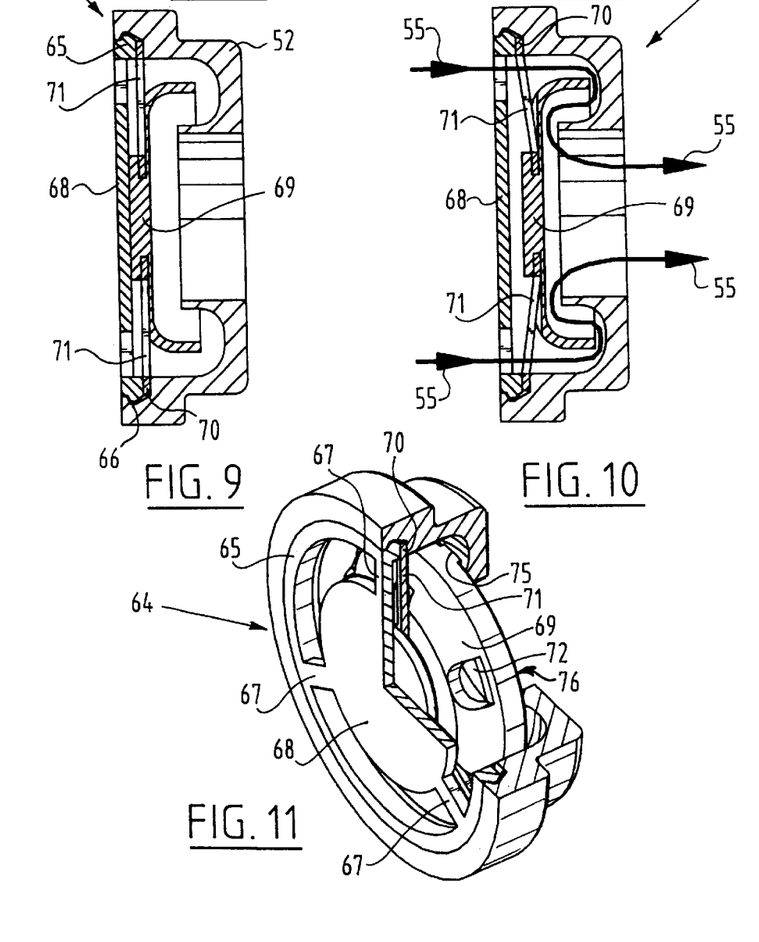
FIGS. 9 and 10 show respective corresponding longitudinal sections through an embodiment as according to FIG. 8 in the situation with flow rate zero and a flow rate varying from zero.
FIG. 11 is a partly broken-away perspective view of the device in the situation of FIG. 9.

FIGS. 9, 10 and 11 show a flow limiter 64 in detail. This device corresponds functionally with the device 62 according to FIG. 8.

Via three spokes 67 the housing 52 bears a plate 68 via a ring 65 connected to the housing 52 by means of a snap-fit connection 66, with the plate 68 placed upstream relative to a first moveable body 69.

Clamped fixedly between the ring 65 and the housing 52 is a steel spring ring 70 which bears the first body 69 in a spring-loaded manner via three radial spokes 71 acting as leaf springs.

As shown particularly clearly in FIG. 11, the first body 69 has three continuous holes 72 which are disposed in the shape of a ring at the same radial positions at mutual angular distances of 120°.

Attention is drawn to the fact that for reasons of flow technique the radial leaf springs 71 are preferably situated behind spokes 67 in the manner shown in FIG. 11.

The embodiments of FIGS. 7, 8, 9, 10 and 11 have a significant aspect in common, i.e. the meander form of the flow of the admitted medium, as indicated with arrows 55 in FIG. 7. Essential for this purpose are the shown complementary form of the beaker-shaped part of the first body 69 on one side and the upstream-directed annular inner edge of the housing 52. In FIGS. 7–11, the housing 52 is a second stationary body of the respectively illustrated flow limiters 51, 62, and 64.

Attention is finally drawn to the protrusions 75 on the rear edge 76 of the first body 69, as shown in FIG. 11. These protrusions have the purpose of ensuring, when a very great pressure force is exerted on the first body 69, that a certain passage is always maintained, whereby the flow rate can never be reduced to zero.

It will be apparent on the basis of the above description that, in contrast to many functionally related devices according to the prior art, the flow limiters according to the invention do not make use of flexible and more or less deformable parts, usually based on the application of thermoplastic or other elastomers. By forgoing such materials, parameters which are poorly manageable in practice, such as elasticity, tolerances and permanent deformations of flexible control bodies, are avoided. The invention is hereby able to ensure a very predictable control characteristic which can be managed and reproduced within narrow limits with very low production wastage during mass production. As examples of the prior art are mentioned as follows DE-A-33 02 759, EP-A-0 115 342, DE-A-38 23 368, DE-A-20 60 751, EP-A-0 350 721 and DE-A-26 16 566. These references illustrate the prior art, according to which the pressure destruction takes place in a very short path, which results in considerable cavitation, strong swirling and mechanical vibrations.

The invention generally provides a flow limiter which in different embodiments offers different significant aspects:

1. The control characteristic satisfies a prescribed norm within very narrow limits and is very predictable and reproducible, resulting in no or negligible product wastage during mass production.
2. Noise production is very low.
3. There is no or negligible danger of cavitation which can adversely affect the lifespan of the products themselves.
4. Production costs are low.
5. There is the option of combining the flow limiting function with the function of a non-return valve.

What is claimed is:

1. A device for limiting the flow rate of a liquid, comprising:
    a substantially tubular and rotation-symmetrical housing defining an inlet opening and an outlet opening for the liquid;
    a substantially rotation-symmetrical first body, with the first body having a widest peripheral part, wherein the first body is guided for axial displacement and urged toward the inlet opening by a spring, and wherein the widest peripheral part of the first body is located at a distance from an inner wall of the housing; and
    a substantially annular second body disposed in a stationary position on the inner wall of the housing and defining a gap with the first body,
    wherein as liquid flow increases through the device the first body moves toward the second body to reduce a passage size of the gap defined by the first body and the second body, and
    wherein the first body and the second body are formed such that liquid flow in the device reverses direction at least once in an axial direction through the device.
2. The device as claimed in claim 1, wherein the housing, the first body and the second body are made of a form-retaining material selected from the group consisting of aluminum, steel, stainless steel, and a plastic selected from the group consisting of ABS, PPA, PA, POM, and PP.
3. The device as claimed in claim 1, wherein the first body has a shape narrowing toward the inlet opening.
4. The device as claimed in claim 3, wherein the first body defines one of a conical, spherical, parabolic and hyperbolic shape narrowing toward the inlet opening.
5. The device as claimed in claim 1, wherein the second body is removable from the housing.
6. The device as claimed in claim 1, wherein the second body defines a plurality of passage openings ordered in a circle.
7. The device as claimed in claim 6, wherein the second body defines a plurality of passage openings ordered in a circle, and wherein the passage openings are located between the cylindrical steps.
8. The device as claimed in claim 1, wherein the gap is defined by respective cooperating surfaces narrowing toward the outlet opening of the device.
9. The device as claimed in claim 8, wherein the cooperating surfaces include cylindrical steps.
10. The device as claimed in claim 8, wherein the cooperating surfaces each define one of a substantially parabolic and a substantially hyperbolic shape.

11. The device as claimed in claim 1, wherein the second body is connected to the housing by a snap-fit connection.

12. The device as claimed in claim 1, wherein the second body defines a plurality of recesses on an inner surface thereof which serve as flow channels.

13. The device as claimed in claim 1, wherein the spring includes memory metal.

14. The device as claimed in claim 1, wherein in a rest position of the first body, the first body presses sealingly against an elastic sealing ring which is connected fixedly to the inner wall of the housing and engages on the first body adjacent to and upstream of the widest peripheral part of the first body such that the device operates as a non-return valve.

15. The device as claimed in claim 1, wherein the first body is supported by a stem slidable in a bush connected by at least one spoke to one of the second body and the housing.

16. The device as claimed in claim 1, wherein the gap is defined by a surface of the first body narrowing toward the outlet opening of the device, and wherein the device further includes a circle of lips formed curving toward the narrowing surface of the first body and having a form narrowing toward the inlet opening of the device such that as the liquid flow rate increases and the first body is displaced in a downstream axial direction the lips bend elastically inward toward the first body.

17. The device as claimed in claim 1, wherein the first body defines with a peripheral edge of the housing a substantially flat, annular inlet opening.

18. The device as claimed in claim 1, further including a plate disposed fixedly relative to the housing and positioned upstream of the first body.

19. The device as claimed in claim 18, wherein the plate defines with a peripheral edge of the housing a substantially flat, annular inlet opening.

20. The device as claimed in claim 1, wherein the spring is a leaf spring.

21. The device as claimed in claim 20, wherein the leaf spring includes a ring connected to the housing and having a plurality of lips supporting the first body.

22. The device as claimed in claim 20, wherein the leaf spring is made of stainless steel.

23. The device as claimed in claim 20, wherein the leaf spring is made by one of etching and laser-cutting.

24. The device as claimed in claim 1, wherein the first body defines at least one continuous hole.

25. The device as claimed in claim 1, wherein the first body has on a downstream end edge thereof a plurality of protrusions between which the liquid flows when the device is in operation.

26. The device as claimed in claim 1, wherein the first body includes a portion extending in a downstream axial direction of the device and positioned in an annular space defined by the housing, with the housing including an annular edge extending in an upstream axial direction of the device such that the liquid flow in the device reverses flow direction at least once in the axial direction through the device.

27. The device as claimed in claim 1, wherein the second body is formed integrally with the housing.

28. A device for limiting the flow rate of a liquid, comprising:

a substantially tubular and rotation-symmetrical housing defining an inlet opening and an outlet opening for the liquid;

a substantially rotation-symmetrical first body, with the first body having a widest peripheral part, and wherein the first body is guided for axial displacement and urged toward the inlet opening by a leaf spring, with the leaf spring including a ring connected to the housing and having a plurality of radially inward extending lips supporting the first body, and wherein the widest peripheral part of the first body is located at a distance from an inner wall of the housing; and a substantially annular second body disposed in a stationary position on the inner wall of the housing and defining a gap with the first body, wherein as liquid flow increases through the device the first body moves toward the second body to reduce a passage size of the gap defined by the first body and the second body.

29. The device as claimed in claim 28, wherein the first body and the second body are formed such that liquid flow in the device reverses flow direction at least once in an axial direction through the device.

30. The device as claimed in claim 29, wherein the first body includes a portion extending in a downstream axial direction of the device and positioned in an annular space defined by the housing, with the housing including an annular edge extending in an upstream axial direction of the device such that the liquid flow in the device reverses flow direction at least once in the axial direction through the device.

31. A The device as claimed in claim 28, wherein the leaf spring is made of stainless steel.

32. The device as claimed in claim 28, wherein the leaf spring is made by one of etching and laser-cutting.

33. The device as claimed in claim 28, wherein the second body is formed integrally with the housing.

* * * * *

UNITED STATES PATENT AND TRADEMARK OFFICE
CERTIFICATE OF CORRECTION

| | | |
|---|---|---|
| PATENT NO. | : 6,216,741 B1 | Page 1 of 1 |
| DATED | : April 17, 2001 | |
| INVENTOR(S) | : Richardus H. A. Aarntzen | |

It is certified that error appears in the above-identified patent and that said Letters Patent is hereby corrected as shown below:

Title page, insert:
-- [30] Foreign Application Priority Data
Jun. 30, 1998 (NL)......................... 1009524
Mar. 18, 1999 (NL)......................... 1011596 --.

Column 5,
Line 2, "spokes 19" should read -- spokes 18 --.

Column 10, claim 31,
Line 44, "A The" should read -- The --.

Signed and Sealed this

Nineteenth Day of February, 2002

Attest:

JAMES E. ROGAN
*Attesting Officer*   *Director of the United States Patent and Trademark Office*